Dec. 8, 1931.  W. GUMPRICH  1,835,864
MEAT CHOPPER
Filed June 2, 1928
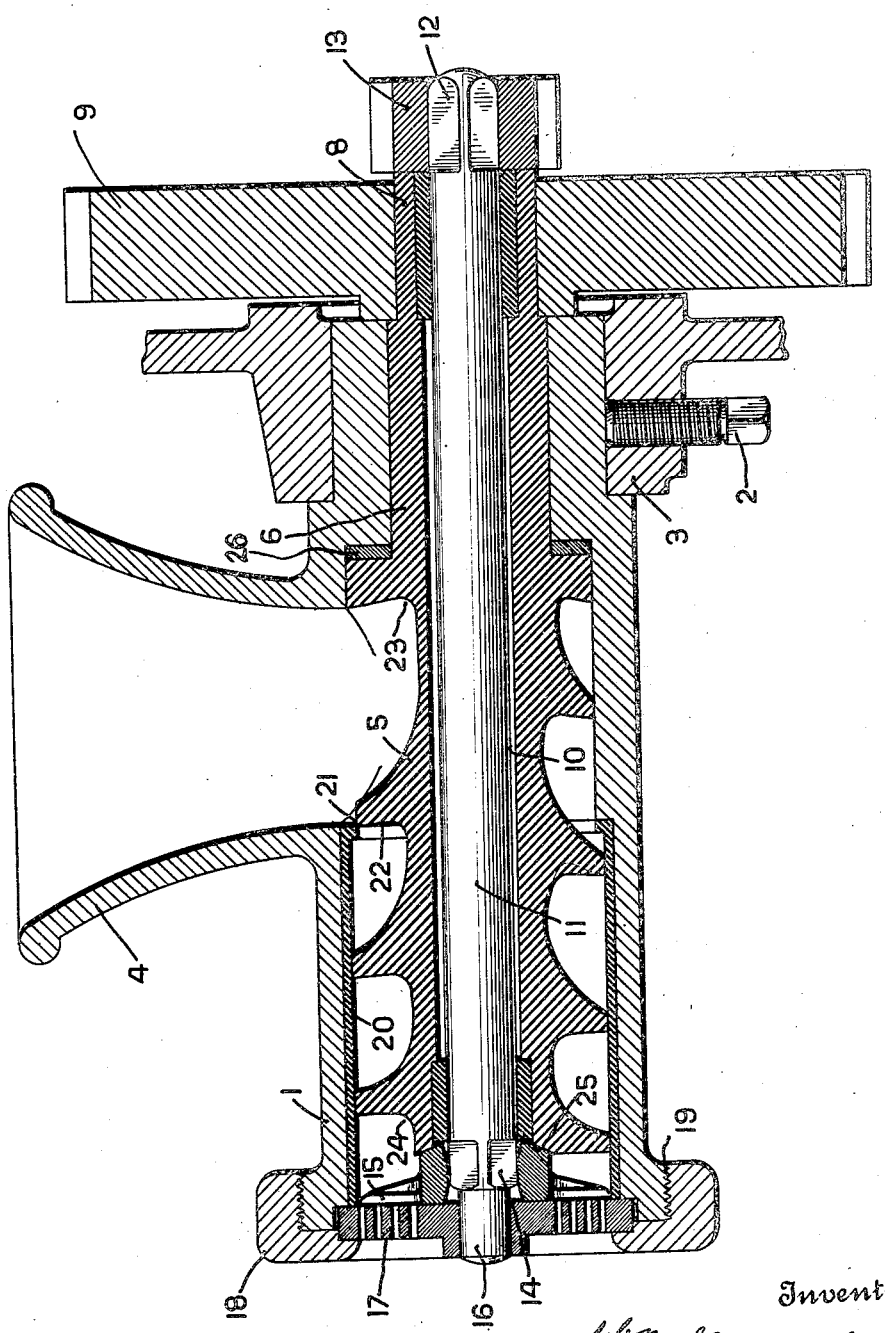

Patented Dec. 8, 1931

1,835,864

UNITED STATES PATENT OFFICE

WILLIAM GUMPRICH, OF BROOKLYN, NEW YORK, ASSIGNOR TO DAYTON SCALE COMPANY, OF DAYTON, OHIO, A CORPORATION OF NEW JERSEY

MEAT CHOPPER

Application filed June 2, 1928. Serial No. 282,385.

This invention relates to food cutting machines, particularly for chopping meat into fine particles.

Meat choppers of ordinary construction are provided with a feed screw for advancing the meat to a rotating knife and extruding it through a perforated plate. The screw is enclosed in a housing and the meat fed to it through a hopper. Attached to the end of the screw and rotating with it is the knife which cuts the meat off as it is forced through the holes in the perforated plate.

One of the faults of known meat choppers of this type is the tendency of the meat to choke the grooves of the feed screw and cause jamming of the meat between the screw and the housing. Another tendency of the feed screw is to push the meat back into the hopper, making it necessary for the operators to push down on the meat, which is usually done with their fingers, often resulting in serious accidents.

The object of this invention is the provision of means for overcoming the tendency of the feed screw or worm to push the meat back into the hopper.

Still further, the object of the invention is the provision of such means as will prevent choking of the worm grooves and jamming of the meat between the housing and the worm.

The object of this invention is to improve the construction of meat choppers by providing a more efficient feeding and cutting action.

More specifically, the object of the invention is the provision of supplementary cutting means to cut the meat preliminary to its reaching the rotating knife.

Another object is the provision of a rotating knife which is independent of the feed screw.

Another object is further to rotate the knife and the feed screw by separate driving means and, if desired, at different speeds.

Still another object is the improvement in construction of the feed screw.

Other objects and advantages will be apparent from the following parts of the specification and the accompanying drawing which shows a longitudinal section through the machine embodying my invention.

Referring to the drawing, the meat chopper is provided with a casing 1 clamped by a set screw 2 to a support 3. Integral with the casing is a flaring hopper 4 through which meat is fed to a worm 5 having a trunnion 6 at its rear end rotatably mounted in the casing. The rear end 8 of the worm extends beyond the end of the casing and is square-shaped to rigidly connect it with a spur gear 9 for driving the worm. The latter is provided with a central opening 10 which rotatably accommodates a shaft 11 having a square-shaped rear end 12 extending beyond the worm end 8 and connected to a pinion 13 for driving the shaft.

The forward end 14 of shaft 11 projects beyond the forward end of the worm and is square-shaped to drive a rotating knife 15 mounted thereon. Projecting from the forward end of shaft 11 is a spindle 16 rotatably journaled in a perforated plate 17 fastened to a clamping ring 18 which is adjustably mounted on the front end of the casing by means of cooperating screw threads 19. Shaft 11 is thus journaled in plate 17 and trunnion 6 while the worm is journaled in the casing and rotatable on shaft 11. The casing is provided with a steel bushing 20 having a cutting edge 21 at the point where the worm forces the meat into the cylindrical portion of the casing. The edge 22 of the worm thread is sharpened to a cutting edge adjacent to cutting edge 21 and cooperates with the cutting edge 21 to cut the meat while it is advanced if the piece is too large to fit the worm groove.

This preliminary cutting prevents jamming of the meat between the sleeve 20 and the worm, thus reducing the power necessary to feed the meat. It also prevents the worm from forcing the large pieces of meat back into the hopper. To still further reduce the tendency of the worm to force the meat back into the hopper, the grooves of the worm are undercut, the overhang of the grooves bearing down on the meat and resisting its tendency to move upward. The undercut of the groove also produces a faster and better feeding of the meat by the worm. The undercutting is a maximum at the beginning of the worm groove as indicated at 23 and gradually reduces to a minimum at the forward end of the groove as indicated at 24. The forward end of the worm is formed with a curved socket 25 cooperating with a similarly curved edge on the hub of knife 15. The opening in the knife hub which is square-shaped to connect it for rotation with the square shaft end 14 is curved longitudinally to permit the knife to rock slightly on the shaft end. The knife may thus accommodate itself to inequalities in the alinement of the machine or to stresses which would tend to deform the knife if it were rigidly fixed to its shaft.

The cutting reaction of knife 21 against the worm and the thrust of the rotating knife 15 is resisted by a thrust washer 26.

It is understood that clearances are provided wherever necessary to prevent friction.

Since shaft 11 is rotated independently of the worm 5, the latter may advance the meat to the knife 15 at any desired rate. For most efficient cutting, the knife is driven at a higher speed than the worm and pinion 13 is accordingly smaller than gear 9.

The independent driving of the knife 15 and worm 5 coupled with the undercut feature of the worm groove and the preliminary cutting of the meat by edge 21 produces a highly efficient meat chopper.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claim:

A food chopper comprising a stationary casing provided with a feed hopper communicating with the interior of the casing, a slidable steel bushing lining the interior of said casing and fixed relative to the casing, the bushing having a smooth uninterrupted cylindrical interior, the bushing being provided with an upset portion at the rear end, said portion extending inwardly and having a bore smaller than the interior of the remainder of the bushing, the inwardly radially extending rear edge of the bore being substantially coincident with the forward bottom edge of the feed hopper, a feed screw rotatable within the casing and having a forward portion of the same diameter as that of the interior of the bushing to engage the bushing at all points thereof during the rotation of the screw to prevent accumulation of food particles within the casing, said screw having a reduced portion in back of the upset portion of the bushing which is provided with an outer edge which during the rotation of the screw is in constant cooperative cutting engagement with the inner circumferential edge of the bore in the reduced bushing portion to cut the food into small pieces, the casing having a reduced interior portion engaged by the convolutions of the reduced portion of the screw to prevent accumulation of particles along said reduced interior portion of the casing, a rotatable knife at the forward end of the casing, a shaft for rotating said knife and on which the knife is universally self alinable, the screw feeding the food to the knife to be cut thereby, and an extrusion cutter in front of said knife.

In testimony whereof I hereto affix my signature.

WILLIAM GUMPRICH.